(12) United States Patent
Zanotta

(10) Patent No.: US 8,091,492 B2
(45) Date of Patent: Jan. 10, 2012

(54) PROCESS AND PLANT FOR PRODUCING A REFUSE DERIVED SOLID FUEL

(75) Inventor: Carlo Zanotta, Milan (IT)

(73) Assignee: Pirelli & C. Ambiente Renewable Energy S.p.A., Milan (IT)

( * ) Notice: Subject to any disclaimer, the term of this patent is extended or adjusted under 35 U.S.C. 154(b) by 117 days.

(21) Appl. No.: 10/594,269

(22) PCT Filed: Mar. 29, 2004

(86) PCT No.: PCT/IT2004/000154
§ 371 (c)(1),
(2), (4) Date: Jul. 24, 2007

(87) PCT Pub. No.: WO2005/093019
PCT Pub. Date: Oct. 6, 2005

(65) Prior Publication Data
US 2007/0283861 A1 Dec. 13, 2007

(51) Int. Cl.
*C10L 5/00* (2006.01)
*C01L 5/46* (2006.01)

(52) U.S. Cl. .......... 110/342; 110/221; 110/222; 44/629; 202/262; 198/57; 222/56; 222/135

(58) Field of Classification Search ........... 110/342.221, 110/222; 44/629; 202/262
See application file for complete search history.

(56) References Cited

U.S. PATENT DOCUMENTS
1,772,285 A   8/1930 Knittel
3,655,098 A * 4/1972 Schnitzler ..................... 222/135
4,314,887 A * 2/1982 Haley et al. ..................... 202/91
(Continued)

FOREIGN PATENT DOCUMENTS
DE   102 24 133 A1   3/2003
(Continued)

OTHER PUBLICATIONS
Adani, F. et al., "Biostabilization of Mechanically Separated Municipal Solid Waste Fraction," Waste Management and Research, vol. 18, Issue 5, p. 471 (2 Sheets), (Oct. 2000).

*Primary Examiner* — Steven B McAllister
*Assistant Examiner* — Nikhil Mashruwala
(74) *Attorney, Agent, or Firm* — Finnegan, Henderson, Farabow, Garrett & Dunner, L.L.P.

(57) ABSTRACT

Process and plant for producing a refuse derived solid fuel (RDSF), including a first component having a dry fraction of a solid urban waste (MSW) in a shredded form and at least one second component in a shredded form selected from an elastomeric material and a thermoplastic material, or mixtures thereof, wherein the dry fraction of the MSW, the elastomeric polymer material and/or the thermoplastic polymer material are stored in separate containers and when required are metered and fed in subsequent layers onto a continuous conveyor which discharges into a temporary accumulating container, for example, the box body of a motor vehicle, intended to directly feed the combustion plant wherein the RDSF is burned. In this way, there is no need to premix the various fractions of the RDSF during the production stage and to maintain the resulting mixture constantly stirred in order to prevent compaction and/or separation of fractions. In fact, mixing between the various fractions only takes place at the end of the production process when the RDSF is placed in the temporary accumulation container which feeds the combustion plant.

27 Claims, 2 Drawing Sheets

U.S. PATENT DOCUMENTS

| | | | |
|---|---|---|---|
| 5,056,998 A * | 10/1991 | Goossens | 425/130 |
| 6,152,974 A * | 11/2000 | Delpiano et al. | 44/593 |
| 6,375,691 B1 * | 4/2002 | Zucchelli et al. | 44/605 |

FOREIGN PATENT DOCUMENTS

| | | |
|---|---|---|
| EP | 0 930 353 B1 | 7/1999 |
| EP | 0 0953 628 B1 | 11/1999 |
| IT | EP 953628 A1 * | 11/1999 |
| RU | 2109035 C1 | 4/1998 |
| RU | 2134288 C1 | 8/1999 |
| RU | 2253668 C1 | 6/2005 |

* cited by examiner

PROCESS AND PLANT FOR PRODUCING A REFUSE DERIVED SOLID FUEL

CROSS REFERENCE TO RELATED APPLICATION

This application is a national phase application based on PCT/IT2004/000154, filed Mar. 29, 2004, the content of which is incorporated herein by reference.

BACKGROUND OF THE INVENTION

1. Field of the Invention

This invention relates to a plant and a method for preparing a refuse derived solid fuel (RDSF).

2. Description of the Related Art

EP-A-0 930 353 discloses a solid fuel composition having a bulk density of less than 0.6 g/cm$^3$, consisting of a mixture comprising a first fraction consisting of the dry fraction deriving from municipal solid waste (MSW), a second fraction consisting of elastomeric material and a third fraction consisting of non-elastomeric polymer material. The ratios between the fractions vary as the desired calorific value varies.

EP-A-0 953 628 discloses a combustible composition which burns instantaneously comprising from 40 to 95% by weight of a fossil fuel and from 60 to 5% by weight of a non-fossil solid fuel selected from the group comprising municipal solid waste (MSW), elastomeric polymer material and non-elastomeric polymer material and mixtures thereof. In the combustion plants disclosed in EP-A-0 953 628 the non-fossil solid fuel is stored in a silo from which it is then delivered to the burner.

The Applicant has first noted that direct feed of the RDSF from the production plant to the combustion plant without storage stages is not normally practicable, since the flow rates required by the latter are generally different from those provided by a plant for the production of RDSF. It should be noted that typically a combustion plant works continuously for 24 hours a day, while the output of RDSF is subject to its production methods, in particular the material collection, which is inherently of a discontinuous nature, and, for example, may be carried out in two shifts a day, for about 16 hours per day.

The Applicant has also noted that the storage of a RDSF consisting of the dry fraction deriving from municipal solid waste (MSW) when mixed with elastomeric polymer material and/or thermoplastic (non-elastomeric) polymer material gives rise to a number of disadvantages.

For the purposes of the present description, by "dry fraction deriving from municipal solid waste (MSW)" is meant a fraction obtained by treating MSW as such by: removal of the wet fraction consisting of putrescible organic material, separation of metal materials, shredding and possibly, if necessary, drying.

A first disadvantage of the storage of RDSF derives from the fact that during storage the aforesaid materials, in particular the dry fraction deriving from the MSW, tend to aggregate, forming compact agglomerations. This could be avoided by using large storage containers provided with complex mixing equipments, for example paddle machines, capable of keeping the stored materials under constant stirring.

However, in addition to resulting in high initial plant costs and then in operating costs for the same, and considerable problems associated with the use of space on account of the large storage volumes required, such storage containers could have the further disadvantage of not hindering but instead favouring separation of the heavier and/or more voluminous particles from the lighter and/or less voluminous particles as a consequence of the action of the mixing equipment itself.

This would therefore result in a non-uniform mixture in terms of composition and density which, if fed to a burner, would cause considerable instability in the combustion process and in particular would not be capable of ensuring a calorific value which was substantially constant over time.

A further problem derives from the fact that it is frequently necessary to vary the composition of the RDSF produced in relation to use requirements in a combustion process, in particular the desired calorific value. It would therefore be necessary to provide a plurality of containers for the storage of different types of RDSF required by the users.

SUMMARY OF THE INVENTION

It has now been found that it is possible to overcome the abovementioned disadvantages deriving from the storage of an RDSF comprising a dry fraction of municipal solid waste (MSW) in admixture with elastomeric polymer material and/or thermoplastic polymer material through a process wherein the dry fraction of the MSW, the elastomeric polymer material and/or the thermoplastic polymer material are stored in separate containers and, when required, are metered and fed in successive layers onto a continuous conveyor which discharges them into a temporary accumulation container, for example the box body of a lorry, intended to directly feed the combustion plant where the RDSF is burnt.

In this way it is not necessary to premix the various fractions of the RDSF during the production stage and to maintain the resultant mixture constantly stirred to prevent agglomeration and/or separation of the fractions. In fact mixing between the various fractions only takes place at the end of the production process when the RDSF is placed in the temporary accumulation container which feeds the combustion plant.

The so obtained mixing is surprisingly effective and is in any event sufficient to guarantee substantial uniformity of composition in the RDSF fed to the combustion plant.

The temporary accumulation container (for example an articulated trailer) is then transported to the combustion plant and the RDSF contained therein is taken from the said container, metered and fed to the burners of the combustion plant, for example by means of an extraction, weighing and pneumatic transportation line.

In this way the period of time from the mixing of the various RDSF fractions to the use of the RDSF in the combustion plant is reduced to a few hours; in addition to this, the volume of mixed RDSF is a relatively small quantity, for example approximately 80-100 cubic meters. This solution allows to avoid the formation of agglomerations and impacting of the materials constituting the RDSF, and to control the moisture content of the final product so that the physical and thermal characteristics of the product are guaranteed. Additionally, large storage silos are not present both at the RDSF production plant and at the combustion plant, thus avoiding investment and maintenance costs and the use of dedicated spaces.

In a first aspect this invention therefore relates to a process for producing a refuse derived solid fuel (RDSF) and feeding the said fuel to a combustion plant, which comprises:

providing a first component consisting of a dry fraction of solid urban waste (MSW) in a shredded form, providing at least one second component in a shredded form selected from an elastomeric material and a thermoplastic material, or mixtures thereof, separately metering and feeding the said first component and the said at least one second component onto a continuous conveyor so as to form overlapping layers of the said components, discharging the said components so assembled into at least one temporary accumulation container so as to mix the said components to form the RDSF, feeding the RDSF so obtained to a combustion plant.

According to a preferred embodiment of the process according to the invention the RDSF produced is subjected to a compaction phase, is transported to the combustion plant and then, before the stage of being fed to the combustion plant, is subjected to a disaggregation stage.

According to a preferred embodiment of the process according to the invention the continuous conveyor collects the various components in the form of successively overlapping layers having a bulk density which increases from the bottom to the top.

According to a further aspect this invention relates to a plant for the production of a refuse derived solid fuel, comprising:

at least one storage container for a first component consisting of a dry fraction of a solid urban waste (MSW) in a shredded form, at least one metering and feeding device for the said first component, at least one storage container for at least one second component in a shredded form selected from an elastomeric material and a thermoplastic material, or mixtures thereof, at least one metering and feeding device for the said at least one second component, at least one continuous conveyor onto which the said components are fed separately from the said storage and metering devices so as to form overlapping layers of the said components, at least one temporary accumulation container into which the said components are discharged from the said at least one continuous conveyor.

According to a preferred embodiment the plant according to the invention also comprises at least one storage container for at least one third component in a shredded form also selected from an elastomeric material and a thermoplastic material, but different from the second component. Preferably, when the second component is a thermoplastic material the third component, if present, will be an elastomeric material and vice versa.

BRIEF DESCRIPTION OF THE DRAWINGS

The invention will now be further described with reference to the following figures wherein.

DETAILED DESCRIPTION OF THE INVENTION

Figure 1:
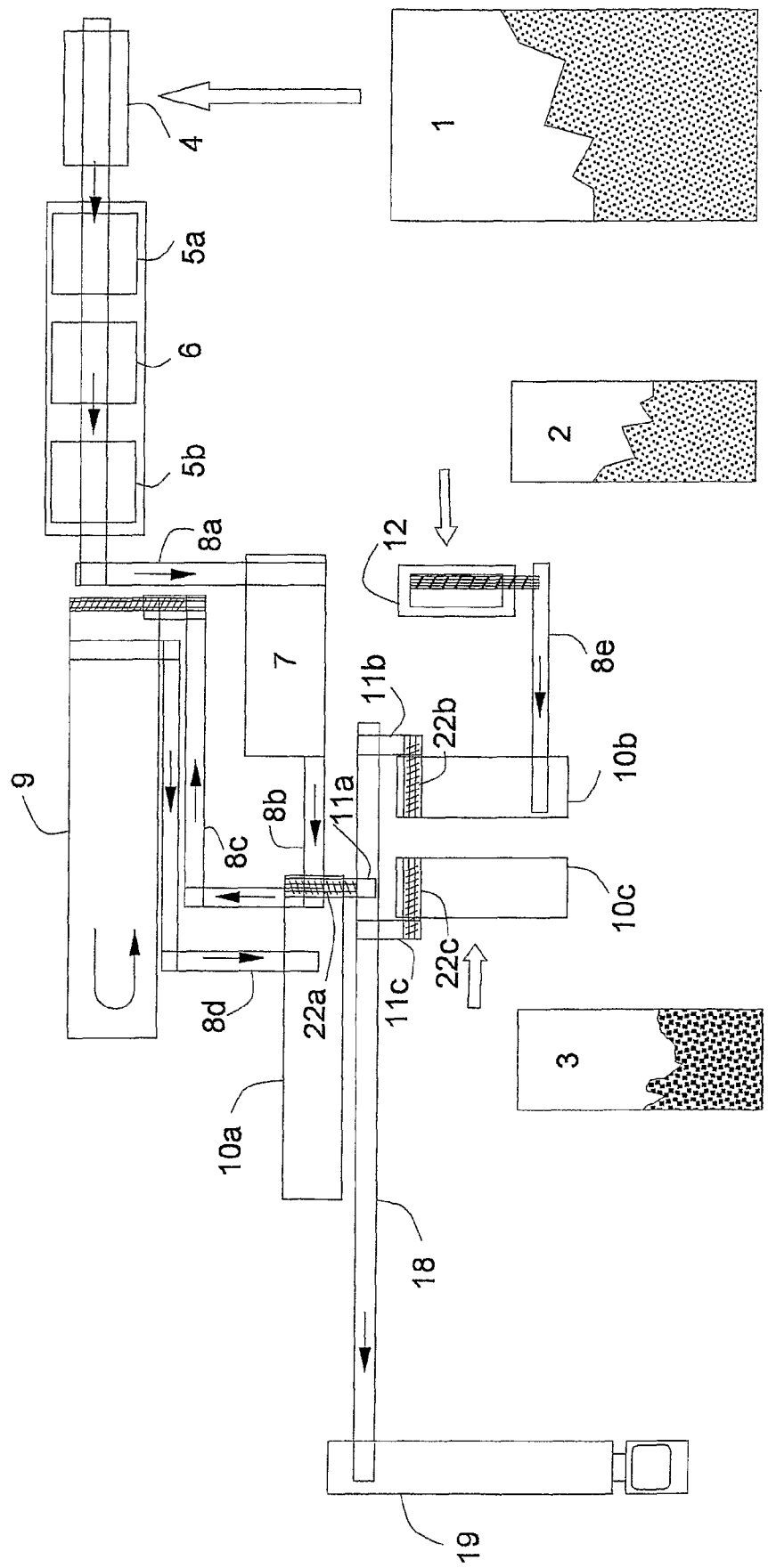
FIG. 1 is a diagrammatical view in plan of a plant according to the present invention.

As illustrated in FIG. 1, in a preferred embodiment the plant according to the present invention comprises a first zone (1) for storage of the dry fraction of the MSW, a second zone (2) for the storage of a thermoplastic polymer material, and a third zone (3) for the storage of an elastomeric polymer material.

Figure 2:
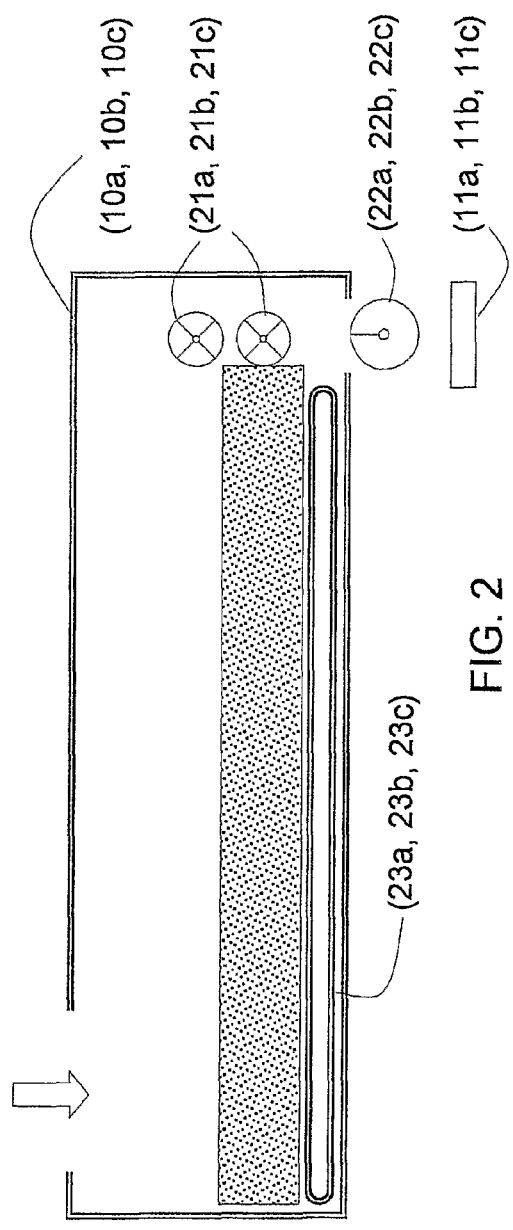
FIG. 2 is a diagrammatical view in longitudinal cross-section of a storage container of the plant in FIG. 1.
Figure 3:
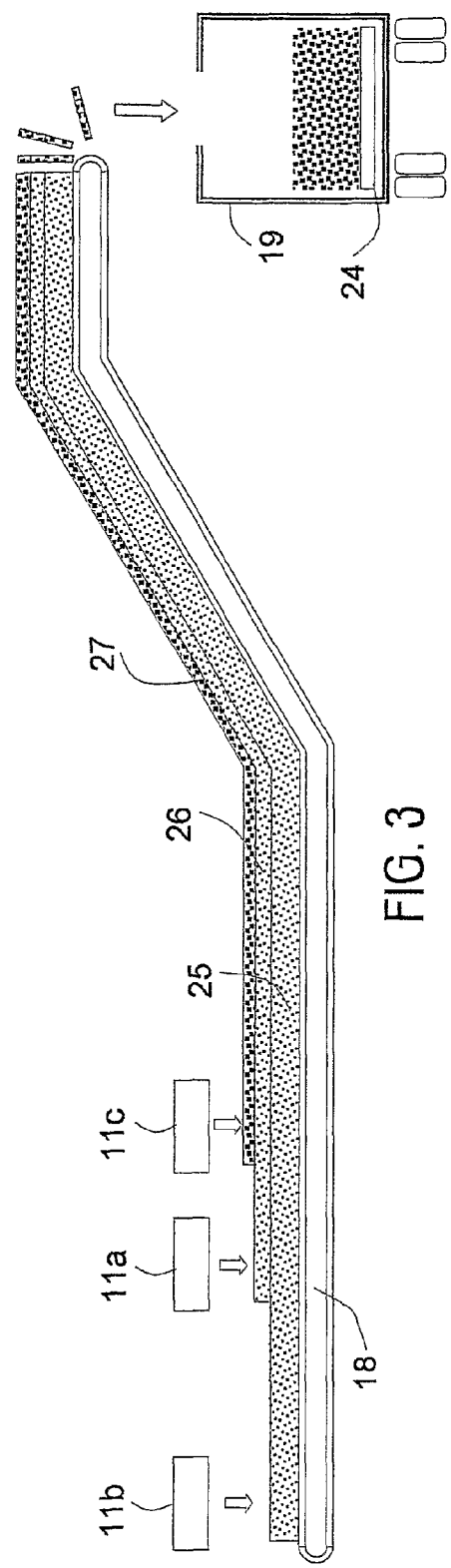
FIG. 3 is a diagrammatical view of a longitudinal cross-section of the continuous conveyor of the plant in FIG. 1.

In the preferred embodiment illustrated in FIGS. 1-3, a thermoplastic polymer material, mainly consisting of material obtained from the shredding of disposable chlorine-free plastics materials originating from separate collection (PLA) and an elastomeric material mainly consisting of material obtained from the shredding of vulcanised rubber articles, in particular waste tyres, after separation of the metal and/or textile reinforcing members, (WT), reach the plant ready to be metered and fed to a continuous conveyor (18).

The dry fraction of the MSW may be obtained by removing the wet fraction (essentially consisting of putrescible organic components, such as plant waste, food waste, etc.) from the raw MSW using purely mechanical processes (for example shredding and subsequent screening), as described for example in the already mentioned patent application EP-A-0 930 353. Subsequently the dry fraction of the MSW may be further shredded and, if necessary, dried to obtain a water content not higher than 15% by weight, preferably not higher than 10% by weight.

As an alternative the dry fraction of the MSW may be obtained in accordance with the known art by subjecting the MSW to a process of biostabilisation, and subsequently to a process of removal of the fine fraction (by screening, for example). The biostabilisation process is a process of biological degradation, in general through microorganisms acting under anaerobic conditions (biooxidation) under controlled temperature and humidity conditions (see for example F. Adani et al., *Waste Management and Research*, Volume 18 Issue 5, page 471—October 2000). At the end of this process the organic fraction which has been transformed by the microorganisms is removed by screening as a fine fraction, that is as a fraction having average dimensions which are generally less than 80 mm, preferably less than 60 mm. The dry fraction so obtained in general has a low moisture content, not more than 15% by weight, preferably not more than 10% by weight, as a result of which a subsequent drying process is not required.

The particle size of the dry fraction of the MSW obtained according to the methods described above is generally further reduced by shredding in order to achieve dimensions not exceeding 25 mm for at least 90% by weight of the material.

The dry fraction of the MSW generally comprises paper and its derivatives (cardboard, multi-ply materials), wood, fabrics, leather and wastes from other fractions of materials.

In case the dry fraction of the MSW reaches the plant at an intermediate processing stage, a unit is provided in the plant according to the invention for its processing, which may comprise a first magnetic separator (5a), a conveyor belt for manual sorting (6), a second magnetic separator (5b) and a drier (9).

In greater detail, in the embodiment in FIG. 1 the dry fraction of the MSW is discharged to the appropriate storage area (1) from motor vehicles. A mechanical rubber-coated loader (not illustrated) picks up the dry fraction of the MSW from the storage area (1) and discharges it into a hopper lying above a feed conveyor (4). The dry fraction of the MSW is subjected to a first sorting with a magnetic separator (5a) in order to remove any ferrous materials. Subsequently the dry fraction may possibly be caused to pass on a sorting conveyor belt (6) where a manual sorting may be performed to remove any undesirable wastes, such as for example stones or other inert materials which might accidentally be present in the MSW which could damage the equipment used in the subsequent stages. A further sorting using a magnetic separator (5b) may remove any residual ferrous materials.

A conveyor belt (8a) then carries the MSW to a shredding device (7), preferably comprising two shredders in series.

When the residual moisture content of the dry fraction of the MSW is not greater than a predetermined value, and in particular is not greater than 15% by weight, this is delivered directly to the storage container (10a) by means of a conveyor belt (8b).

However, when the residual moisture content of the dry fraction of the MSW is greater than that predetermined value it is delivered to a drier (9) via a conveyor belt (8c). The drier generally operates on hot air at a temperature of between 60° C. and 80° C., obtained for example by heating ambient air with a methane burner. The drier (9) also comprises a blower system to remove the exiting moist air. Once the desired moisture content has been reached, the dry fraction of the MSW is delivered to the storage container (10a) by means of a conveyor (8d).

The storage container (10a), which is closed at the top, is provided with a walking floor (23a) and containing sides. A system of rotating paddles (21a) to move the dry fraction of the MSW before delivering it to the metering screw (22a) and subsequently to a weighing system (11a) (for example a weighing belt or a load cell, or other known system) is installed close to the discharge head. Advantageously the metering screw has a rate of advance which is regulated in relation to the quantity of each component weighed by the corresponding weighing system. In this way a substantially constant composition of the RDSF is obtained.

The characteristics of the dry fraction of the MSW stored in the storage container (10a) are preferably the following:

| | |
|---|---|
| Residual moisture content: | not greater than 15% by weight |
| Dimensions of at least 90% by weight of the particles: | not larger than 25 mm |
| Average net calorific value (NCV): | not less than 3,500 Kcal/kg |
| Bulk density: | 0.10-0.20 g/cm³ |

The thermoplastic polymer material mainly comprises material obtained from the shredding of chlorine-free waste plastics materials (PLA) originating from separate collection, such as for example polyethylene terephthalate (PET), polypropylene (PP), polyethylene (PE) and polystyrene (PS).

According to the embodiment of the plant according to the invention illustrated in FIGS. 1-3, the shredded PLA is taken from the storage zone (2) by a mechanical loader and discharged into the loading hopper (12). From there a conveyor (8e), for example a chain conveyor, carries it to the storage container (10b), which has a structure similar to that of the container (10a) previously illustrated. The storage container (10b) is provided with a walking floor (23b) and containing sides. A system of rotating paddles (21b) for moving the shredded PLA before delivering it to the metering screw (22b) (FIG. 2) and subsequently to a weighing system (11b) is installed close to the discharge head.

The characteristics of the shredded PLA stored in the storage container (10b) are preferably as follows:

| | |
|---|---|
| Dimension of at least 90% by weight of the particles: | not larger than 25 mm |
| Average net calorific value (NCV): | not less than 7,000 Kcal/kg |
| Bulk density: | 0.10-0.15 g/cm³. |

The elastomeric polymer material mainly comprises material obtained from the shredding of vulcanised rubber articles, in particular waste tyres (WT), after separation of the metal and/or textile reinforcing members.

In the embodiment of the plant according to the invention illustrated in FIGS. 1-3, the WT are taken from the storage area (3) and charged into the storage container (10c), which has a structure similar to that of the storage containers (10a, 10b) previously illustrated. Storage container (10c) is generally provided with a walking floor (23c) and containing sides. A system of rotating paddles (21c) to move the shredded WT before delivering it to the metering screw (22c) (FIG. 2) and subsequently to a weighing system (11c) is installed close to the discharge head.

The characteristics of the shredded WT stored in the storage container (10c) are preferably as follows:

| | |
|---|---|
| Dimensions of at least 90% by weight of the particles: | not larger than 25 mm |
| Average net calorific value (NCV): | not less than 7,000 Kcal/kg |
| Bulk density: | 0.40-0.70 g/cm³ |

Once weighed the three materials pass onto a continuous conveyor (18), for example a conveyor belt or a chain conveyor. The advancing rate in the metering screws (22a, 22b and 22c) of the three components of the RDSF is controlled in relation to data obtained from the weighing systems (11a, 11b, 11c) so as to guarantee a substantially constant composition for the exiting RDSF.

Transfer of the three components of the RDSF (PLA, dry fraction of MSW and WT) from the corresponding metering screws (22a, 22b, 22c) to the weighing systems (11a, 11b, 11c) and subsequently to the continuous conveyor (18) advantageously takes place through gravity.

As illustrated in FIG. 3, the continuous conveyor (18) preferably first collects the PLA fraction stored in the container (10b), then the dry fraction of MSW stored in the container (10a) and finally the WT fraction stored in the container (10c), In the stratification so obtained onto the continuous conveyor (18), the lower layer (25) is formed of the lightest material (PLA), the intermediate layer (26) is formed of the material having an intermediate weight (dry fraction of the MSW) and the upper layer (27) is formed from the heaviest material (WT). In this way the lightest fraction is prevented from dispersing in the environment during the movement of the so stratified materials.

Finally, the continuous conveyor (18) discharges the collected material into a temporary accumulation container, for example in the articulated trailer (19) of a motor vehicle. The said articulated trailer (19) is provided with a walking floor (24) for loading and discharging the RDSF.

As they fall into the box body (19) of the motor vehicle, the three layers (25, 26, 27) of the materials accumulated on the continuous conveyor (18) mix each other.

Surprisingly it has been observed that this mixing is particularly effective when the lower layer (25) is formed of the lightest material (PLA), the intermediate layer (26) is formed of the material having an intermediate weight (MSW) and the upper layer (27) is formed of the heaviest material (WT).

The bull density of the RDSF so obtained is generally less than 0.60 g/cm³, preferably it ranges from 0.35 to 0.12 g/cm³.

As already mentioned previously, in accordance with one embodiment of the invention the RDSF so obtained can be subjected to a compaction stage (for example by mechanical compression) so as to provide a compacted RDSF in any form suitable for transport, for example substantially rectangular or cylindrical. The compaction stage may be carried out by any mechanical device suitable for the purpose, for example a press (not shown in the Figures). Compaction is carried out in such a way as to obtain a bulk density for the compacted RDSF which generally lies between 0.50 and 0.95 g/cm$^3$, preferably between 0.60 and 0.90 g/cm$^3$. This makes it possible to reduce the volume of the conveyed material and therefore the transport costs, particularly over long distances.

In this case, at the time of use the compacted RDSF may be again disaggregated in order to reacquire the physical characteristics (in particular the bulk density values indicated above) which render it particularly suitable for combustion processes with suspension burners, and in particular co-combustion processes with fossil fuels, such as those disclosed in the already cited patent application EP-A-0 953 628. With this aim at least one mechanical device capable of disaggregating the compacted RDSF, for example a shredder, is provided close to the combustion plant.

The plant in FIG. 1 is preferably provided with a control system (not illustrated) which is capable of automating the various stages of treatment and of communicating, suitably through video terminals, with the operators operating the plant.

This control system essentially comprises a programmable control unit (PCU).

The control system offers the following main control choices:
  settings for the flows of the various materials delivered to the motor vehicle loading unit,
  selection of the three lines which will be subjected to processing,
  management of the operating cycles,
  monitoring of the condition of the process machines served,
  diagnosis of alarms in the machines served.

Automatic starting of the system will bring about starting of all the machines forming part of the selected systems in sequence. The starting sequence is structured on the basis of first starting the last machine in the selected lines (tail) and then moving backwards starting up all the others in succession until the machines at the head of the lines (moving floor feeders) are started. This makes it possible to prevent the loaded material from accumulating in machines which are still stopped, clogging them. Vice versa, on the same principle, stopping of the system causes the machines to stop in succession away from the head.

A typical composition of a solid fuel deriving from wastes (RDSF) produced according to this invention is as follows:
40-90% by weight, preferably 60-80% by weight, of a dry fraction of MSW,
10-60% by weight, preferably 20-40% by weight, of at least one polymer material selected from elastomeric material and thermoplastic material, or mixtures thereof.

Even more preferably, the solid fuel deriving from wastes (RDSF) produced according to this invention has the following composition:
40-90% by weight, preferably 60-80% by weight, of a dry fraction of MSW,
5-55% by weight, preferably 10-30% by weight, of at least one elastomeric polymer material,
5-55% by weight, preferably 10-30% by weight, of at least one thermoplastic polymer material.

The bulk density of the RDSF delivered to a combustion plant is generally less than 0.60 g/cm$^3$, preferably ranging from 0.35 to 0.12 g/cm$^3$.

The RDSF obtained according to this invention may comprise the primary fuel of a combustion plant, or it may be used as a secondary fuel in co-combustion plants, as illustrated in the already cited patent application EP-A-0 953 628 in which the primary fuel comprises a fossil fuel, for example powdered coal, methane gas or fuel oil.

The combustion plant may be of any type, for example a thermal plant for the generation of heat, a thermoelectric plant for the generation of electrical power, a plant for the manufacture of cement, and the like.

The invention claimed is:

1. A process for producing a refuse derived solid fuel and feeding said fuel to a combustion plant, which comprises:
   providing a first component consisting of a dry fraction of solid urban waste in a shredded form;
   providing at least one second component in a shredded form selected from an elastomeric material and a thermoplastic material, or mixtures thereof;
   separately metering and feeding said first shredded component and said at least one second shredded component onto a continuous conveyor in such a way so as to form successive layers of said shredded components on said continuous conveyor, wherein each of said layers comprises a top and a bottom surface and wherein the top surface of a previously formed layer is in contact with the bottom surface of a successively formed layer and wherein the successive layers have a bulk density which increases from the bottom toward the top;
   discharging said shredded components so assembled into at least one temporary accumulation container so as to form the refuse derived solid fuel; and
   feeding and metering the refuse derived solid fuel so obtained to a combustion plant.

2. The process according to claim 1, wherein the thermoplastic material mainly comprises a material obtained from the shredding of chlorine-free waste plastics materials.

3. The process according to claim 2, wherein at least 90% of the weight of thermoplastic material has an average particle dimension not exceeding 25 mm.

4. The process according to claim 1, wherein the elastomeric material mainly consists of a material obtained from the shredding of waste tyres after separation of the metal and/or textile reinforcing members.

5. The process according to claim 4, wherein at least 90% by weight of the elastomeric material has an average particle dimension not exceeding ranging from 5 mm to 25 mm.

6. The process according to claim 1, wherein the dry fraction of the solid urban waste is obtained from an unprocessed solid urban waste by mechanical separation of putrescible organic fraction, separation of metal materials, shredding and, optionally, drying.

7. The process according to claim 1, wherein the dry fraction of solid urban waste is obtained by subjecting a raw solid urban waste to a process of biostabilisation and subsequently a process of removing a fine fraction.

8. The process according to claim 7, wherein the removed fine fraction has a dimension of less than 80 mm.

9. The process according to claim 1, wherein at least 90% by weight of the dry fraction of solid urban waste has an average particle dimension not exceeding 25 mm.

10. The process according to claim 1, wherein the dry fraction of solid urban waste has a moisture content not exceeding 15% by weight.

11. The process according to claim 10, wherein the dry fraction of solid urban waste has a moisture content not exceeding 10% by weight.

12. The process according to claim 1, wherein the produced refuse derived solid fuel is subjected to a stage of compaction, transported to the combustion plant, and then subjected to a disaggregation stage before the stage of feeding it to the combustion plant.

13. The process according to claim 12, wherein the compacting stage is carried out so as to obtain a compacted refuse derived solid fuel with a bulk density of 0.50 to 0.95 g/cm$^3$.

14. The process according to claim 13, wherein the compacting stage is carried out in such a way so as to obtain a compacted refuse derived solid fuel with a bulk density of 0.60 to 0.90 g/cm$^3$.

15. The process according to claim 1, wherein the stage of metering and feeding said first component and said at least one second component onto a continuous conveyor takes place separately, each through at least one metering screw and subsequently a weighing system.

16. The process according to claim 15, wherein said at least one metering screw has an advancing rate regulated in relation to the quantity of each component weighed by the corresponding weighing system.

17. The process according to claim 1, wherein a lower layer of the thermoplastic material, an intermediate layer of the dry fraction of the solid urban waste, and an upper layer of the elastomeric material is formed on the continuous conveyor belt.

18. The process according to claim 1, wherein the obtained refuse derived solid fuel has the following composition:
    40-90% by weight of the dry fraction of the refuse derived solid fuel; and
    10-60% by weight of at least one polymer material selected from elastomeric material and thermoplastic material, or mixtures thereof.

19. The process according to claim 18, wherein the obtained refuse derived solid fuel has the following composition:
    60-80% by weight of the dry fraction of solid urban waste; and
    20-40% by weight of at least one polymer material selected from elastomeric material and thermoplastic material, or mixtures thereof.

20. The process according to claim 18, wherein the obtained refuse derived solid fuel has the following composition:
    40-90% by weight of dry fraction of refuse derived solid fuel;
    5-55% by weight of at least one elastomeric polymer material; and
    5-55% by weight of at least one thermoplastic polymer material.

21. The process according to claim 20, wherein the obtained refuse derived solid fuel has the following composition:
    60-80% by weight of the dry fraction of the solid urban waste;
    10-30% by weight of at least one elastomeric polymer material; and
    10-30% by weight of at least one thermoplastic polymer material.

22. The process according to claim 1, wherein the obtained refuse derived solid fuel has a bulk density of less than 0.60 g/cm$^3$.

23. The process according to claim 22, wherein the refuse derived solid fuel obtained has a bulk density of 0.35 to 0.12 g/cm$^3$.

24. A plant for producing a refuse derived solid fuel, comprising a dry fraction of solid urban waste in shredded form:
    at least one storage container for a first component consisting of said dry fraction of solid urban waste in a shredded form;
    at least one first metering and feeding device for said first shredded component at least one second component in shredded form selected from the group consisting of elastomeric materials and thermoplastic materials;
    at least one storage container for said at least one second component in shredded form;
    at least one second metering and feeding device for said at least one second shredded component;
    at least one continuous conveyor onto which said shredded components are fed separately by said first and second at least one metering and feeding devices; wherein said at least one first and second metering and feeding devices are located in positions on said continuous conveyor such that the first and second at least one metering and feeding devices form successive layers of said shredded components on said continuous conveyor such that bulk density increases from the bottom to the top layer, wherein each of said layers comprises a top and a bottom surface and wherein the top surface of a previously formed layer is in contact with the bottom surface of a successively formed layer;
    at least one temporary accumulation container into which said shredded components are discharged by said at least one continuous conveyor and; a device for compaction of the shredded components.

25. The plant according to claim 24, further comprising at least one storage container for at least one third component in shredded form also selected from an elastomeric material and a thermoplastic material, different from the second component, and at least one metering and feeding device for said at least one third component.

26. The plant according to claim 24, wherein said metering and feeding devices comprise at least one metering screw and a weighing system.

27. The plant according to claim 26, wherein said at least one metering screw has an advancing rate which is regulated in relation to the quantity of each component weighed by the corresponding weighing system.

* * * * *